United States Patent [19]
Halimi

[11] Patent Number: 5,771,695
[45] Date of Patent: Jun. 30, 1998

[54] METHOD AND APPARATUS FOR OVERCOMING TURBO LAG

[76] Inventor: Edward M. Halimi, 370 Ortega Ridge Rd., Montecito, Calif. 93108

[21] Appl. No.: 21,966

[22] Filed: Feb. 24, 1993

Related U.S. Application Data

[63] Continuation-in-part of Ser. No. 707,696, May 30, 1991, abandoned.

[51] Int. Cl.⁶ .................................................. F02B 33/44
[52] U.S. Cl. .............................................. 60/608; 60/607
[58] Field of Search ...................... 60/607, 608; 123/565

[56] References Cited

U.S. PATENT DOCUMENTS

| | | | |
|---|---|---|---|
| 1,428,924 | 9/1922 | Thomas | 60/608 |
| 2,109,237 | 2/1938 | Lustig | 60/607 |
| 2,402,725 | 6/1946 | Birkigt | 60/608 |
| 2,654,991 | 10/1953 | Nettel | 60/608 |
| 2,710,521 | 6/1955 | Nettel | 60/608 |
| 3,473,322 | 10/1969 | Wolf | 60/607 |
| 3,676,999 | 7/1972 | Oldfield | 60/608 |

FOREIGN PATENT DOCUMENTS

| | | | |
|---|---|---|---|
| 113576 | 8/1941 | Australia | 60/607 |
| 304384 | 2/1989 | European Pat. Off. | 60/608 |
| 2183337 | 12/1973 | France | 60/608 |
| 20516 | 2/1982 | Japan | 60/608 |
| 10115 | 1/1983 | Japan | 123/565 |
| 101540 | 6/1984 | Japan | 60/608 |
| 165822 | 9/1984 | Japan | 123/565 |
| 131920 | 6/1987 | Japan | 60/608 |

*Primary Examiner*—Richard A. Bertsch
*Assistant Examiner*—Charles G. Freay
*Attorney, Agent, or Firm*—Allan N. Shapiro

[57] ABSTRACT

A method and apparatus for improving the time response of a turbo-compressor assisted internal combustion engine wherein the turbo-compressor is driven by an electric motor at a speed somewhat less than its full-load operating speed until such time as the turbo-compressor is driven at a higher speed by an exhaust gas turbine. The electric motor is provided to maintain the minimum rotational speed of the turbo-compressor when the engine load is low so that the turbo-compressor is ready for prompt response when driven by increasing exhaust gas as a result of additional load demand on the internal combustion engine.

15 Claims, 7 Drawing Sheets

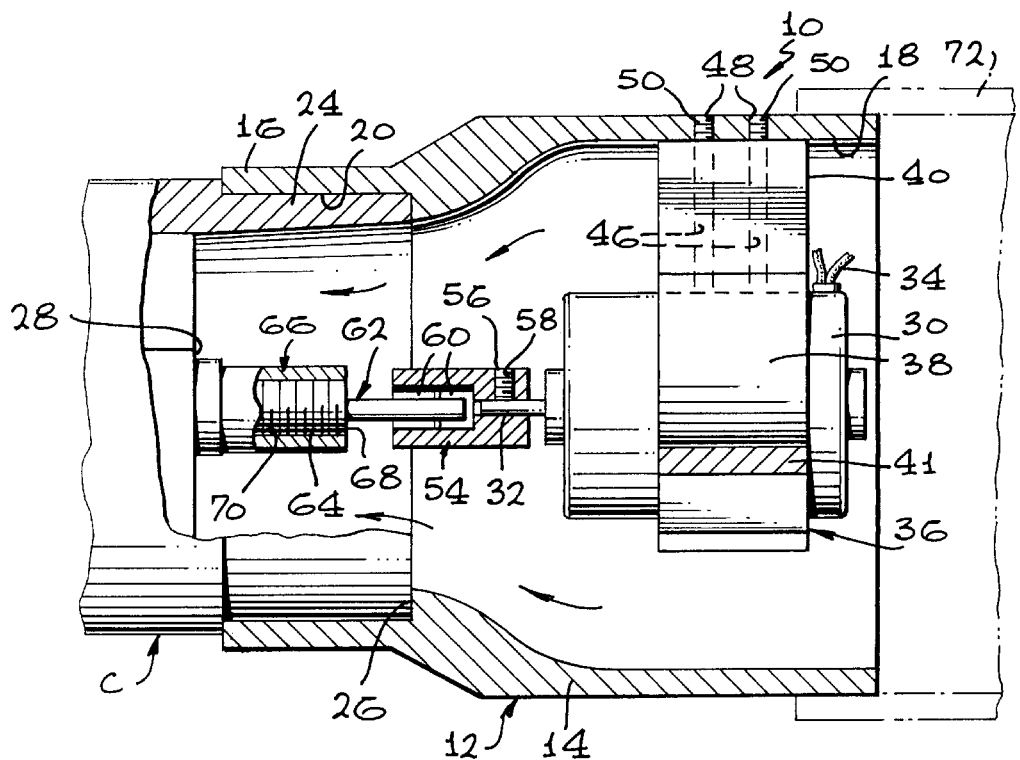
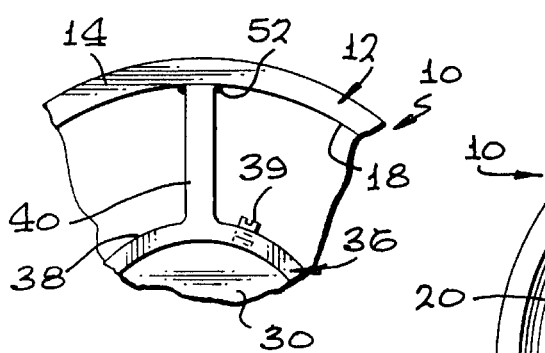
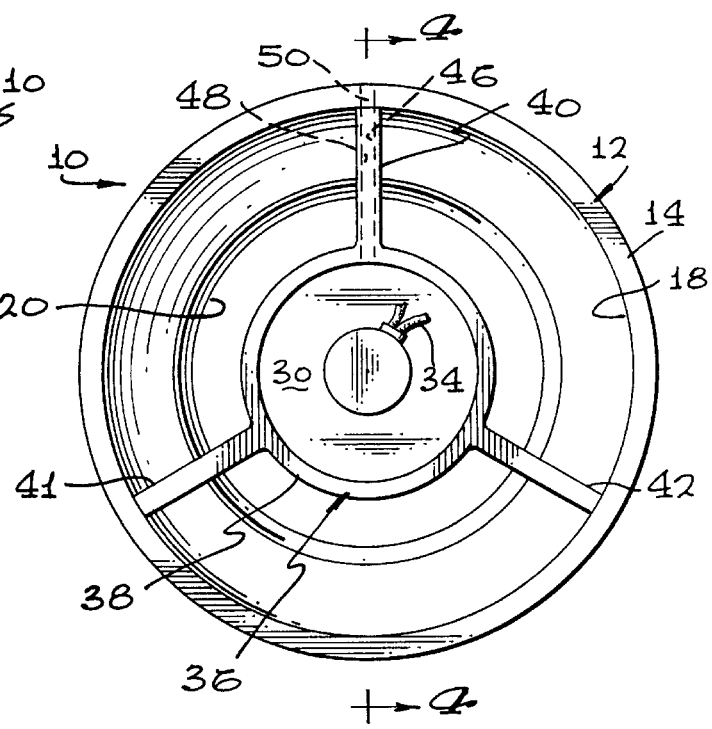

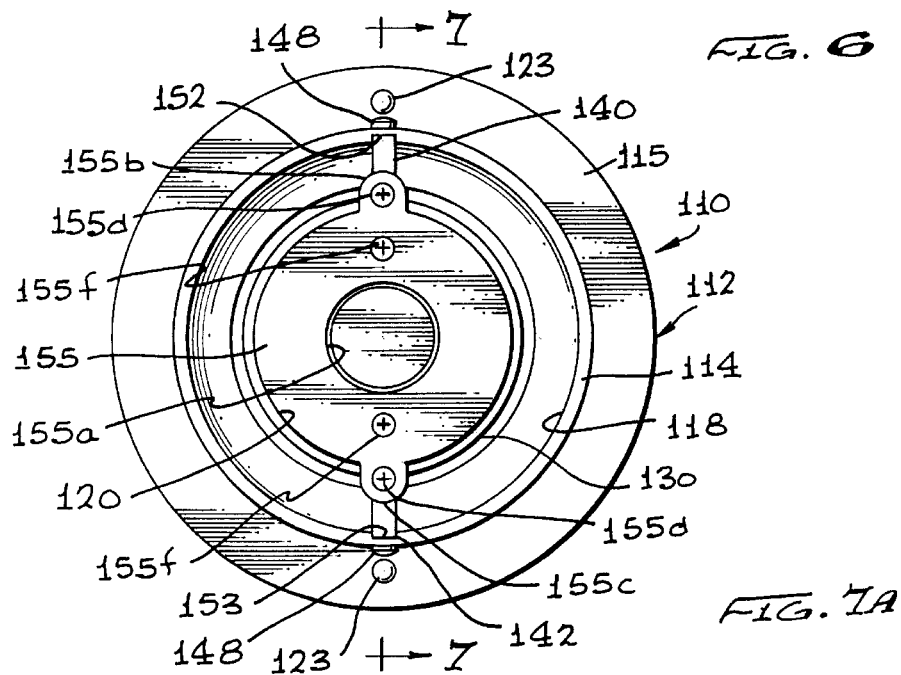
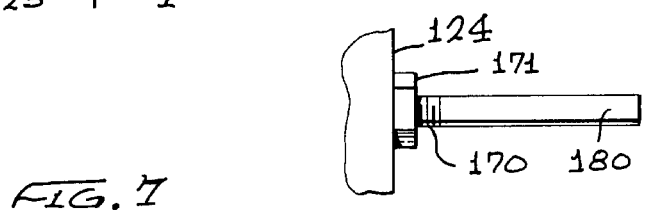
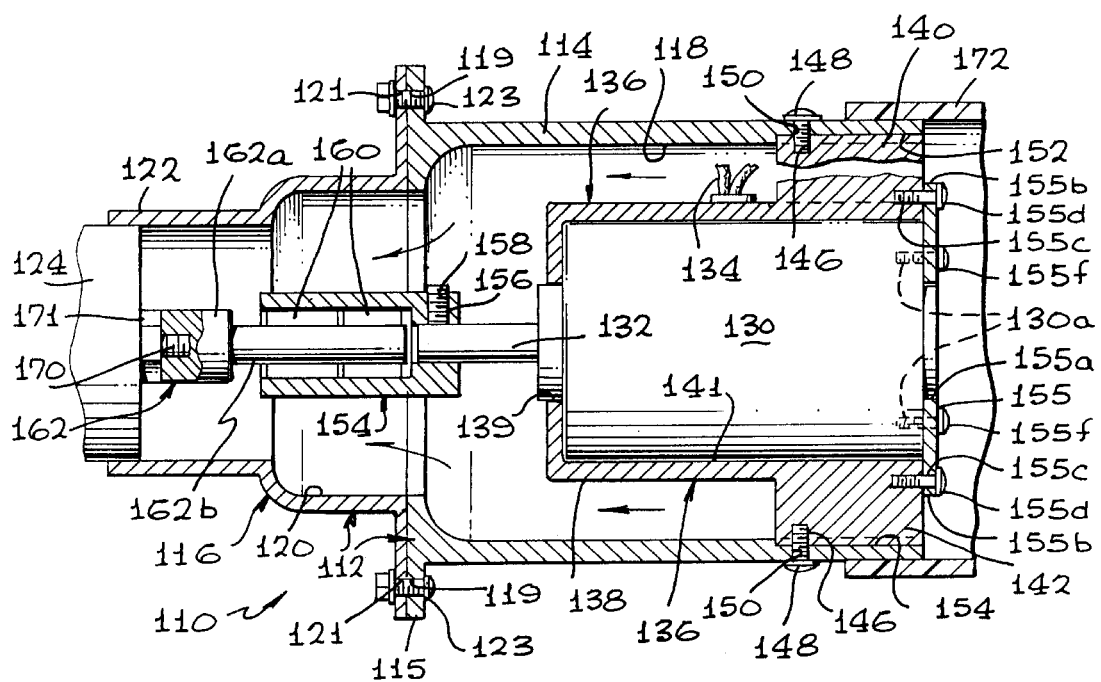

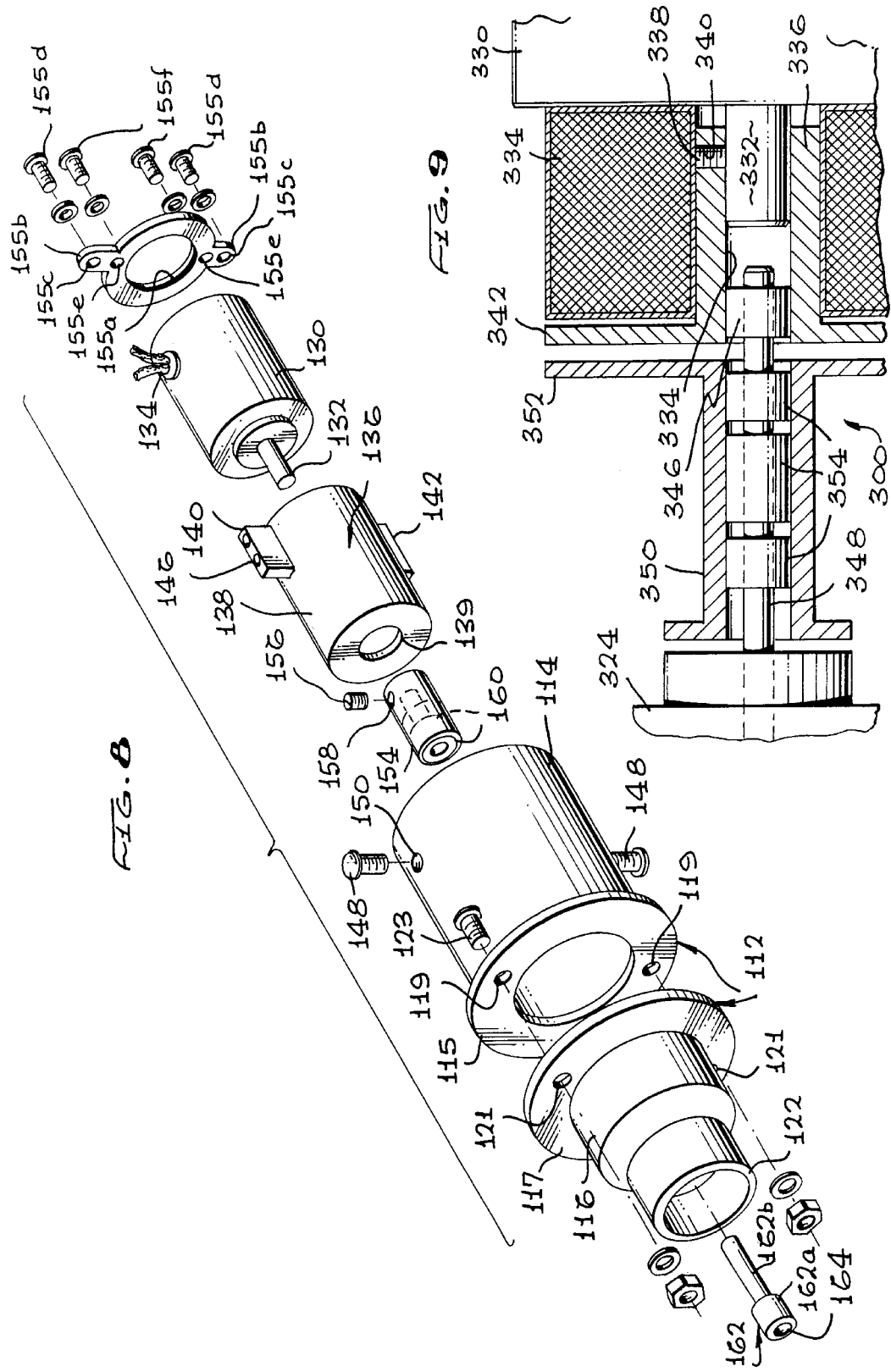

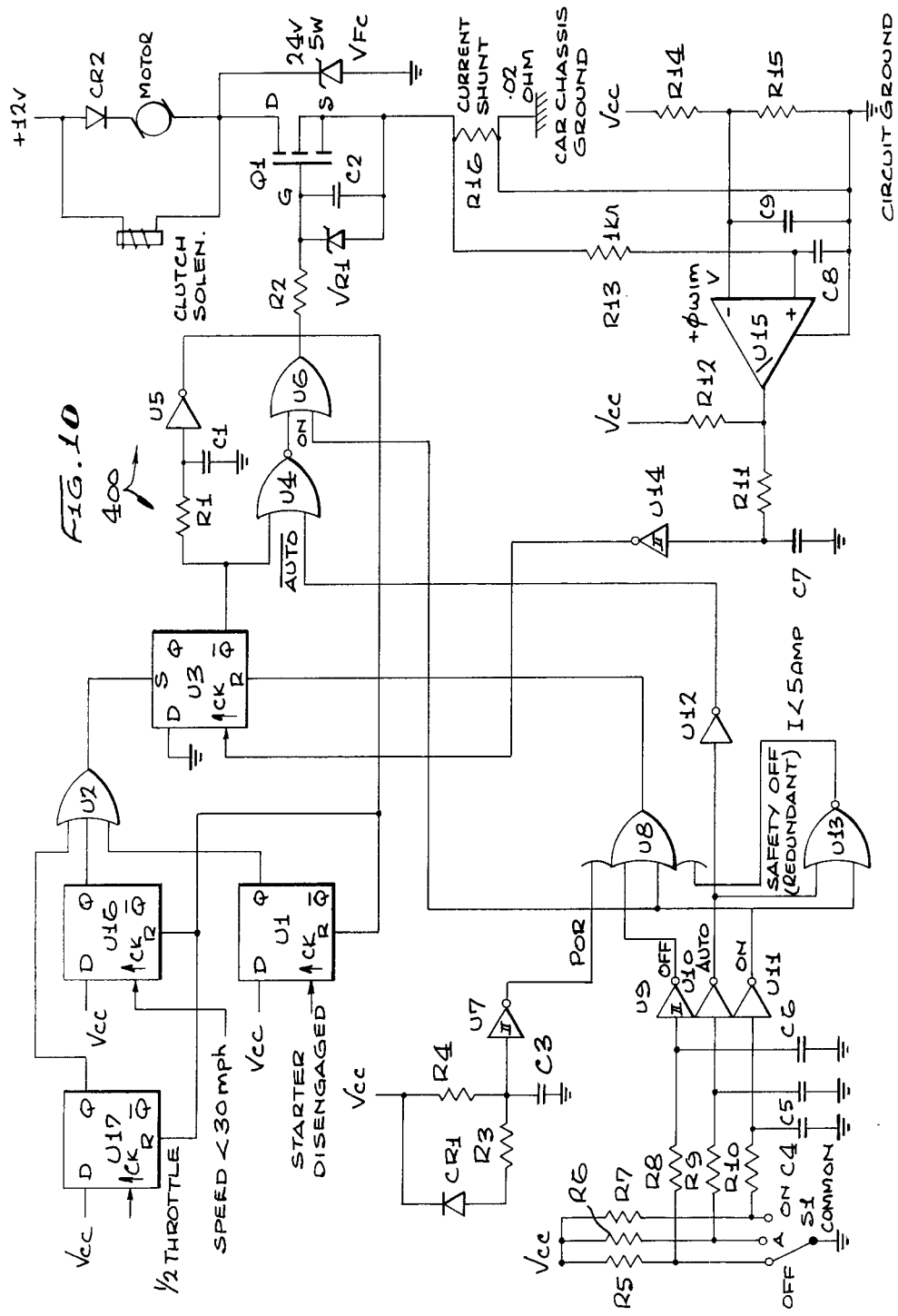

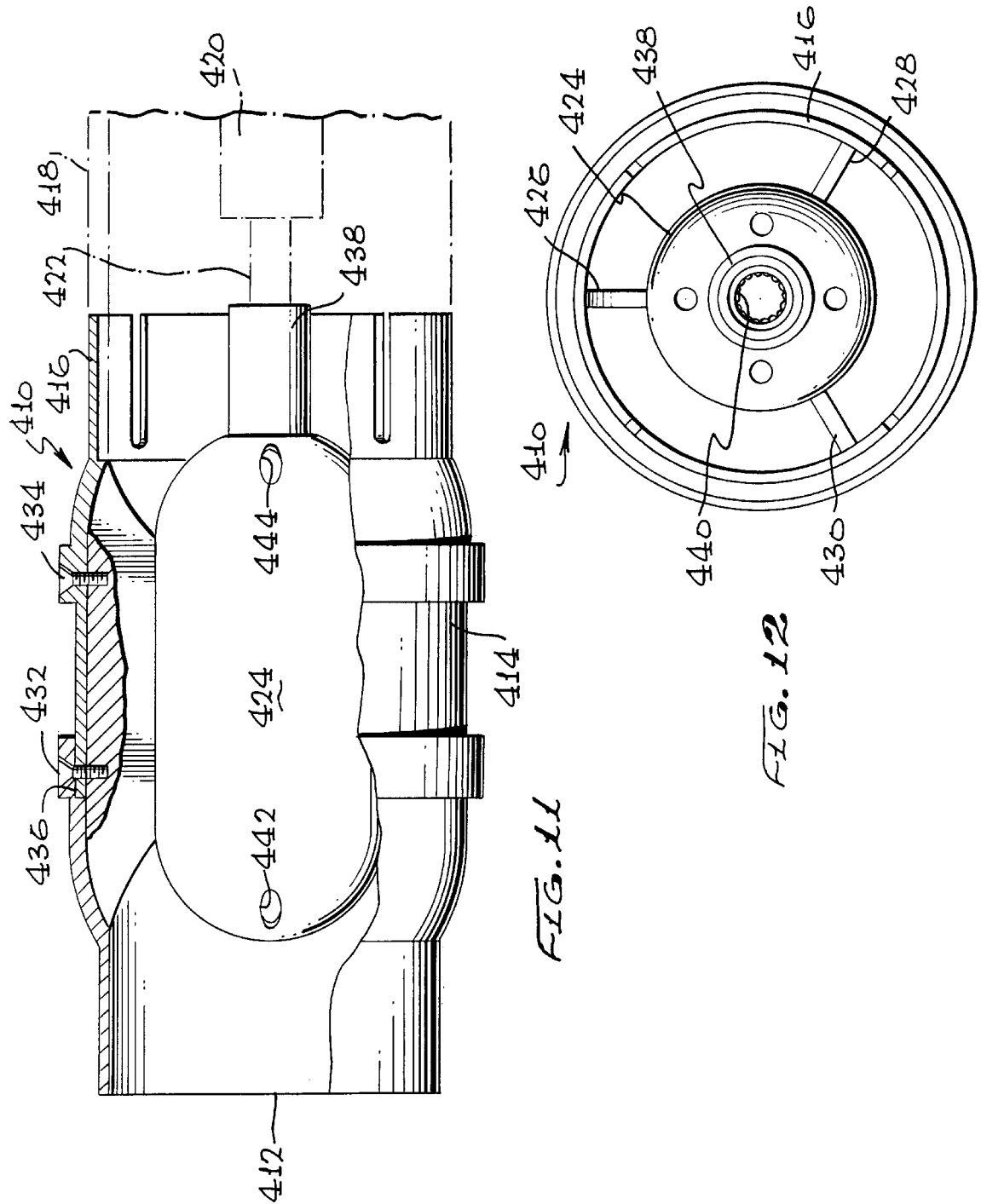

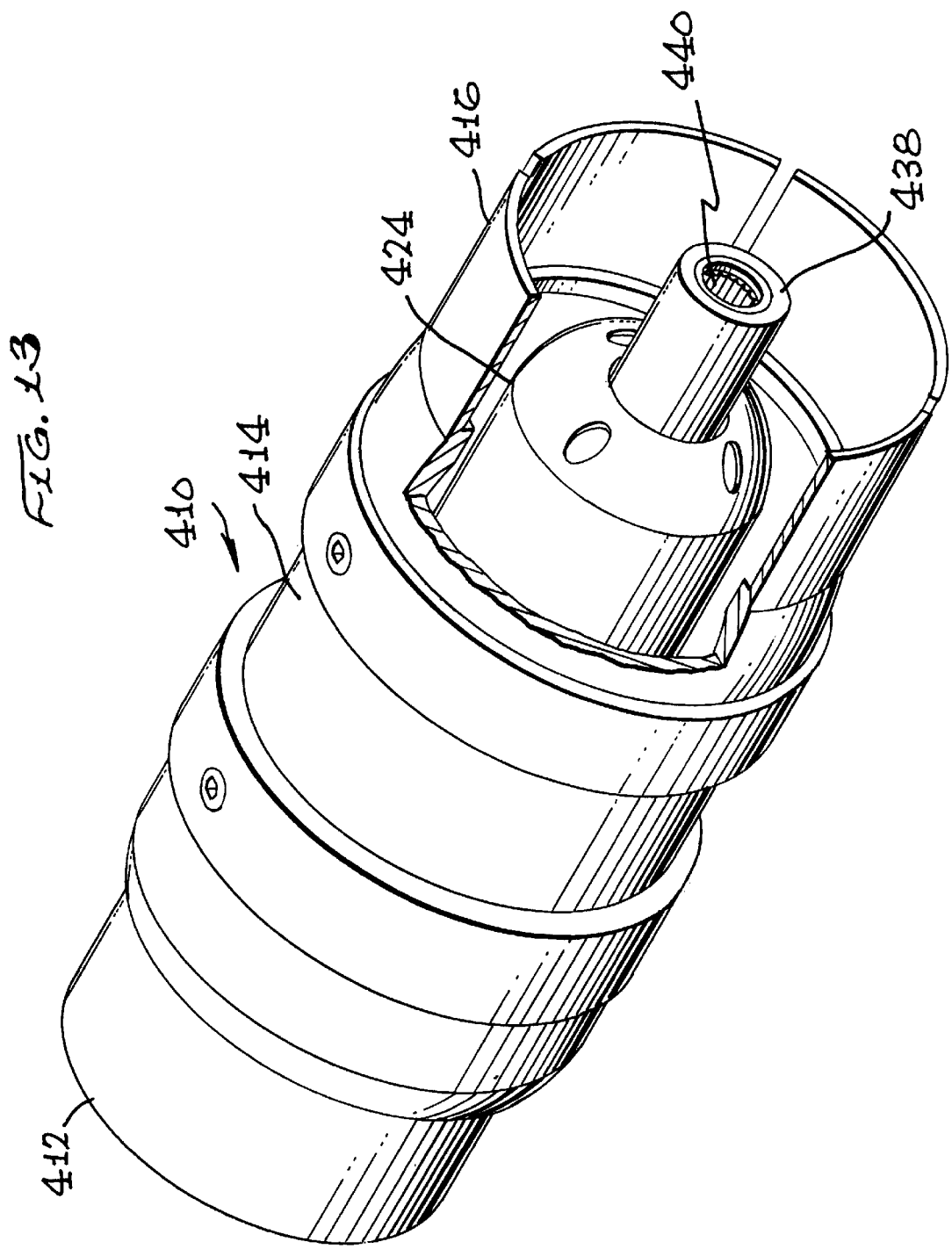

METHOD AND APPARATUS FOR OVERCOMING TURBO LAG

CROSS REFERENCE

This patent application is a continuation-in-part of my prior application, Ser. No. 07/707,696, filed May 30, 1991 for "Method and Apparatus for Overcoming Turbo Lag, now abandoned.

FIELD OF THE INVENTION

This invention is in the general field of turbocharger enhanced power for automotive vehicles or the like wherein the vehicle's normal power (such as an internal combustion engine or the like) is augmented by a turbocharger under certain power requirements. The invention is even more particularly directed to a turbocharger wherein a turbo-expander drives a rotary compressor in a power system having an electric motor assist the turbo-expander. The turbocharger assistance is called upon by the conditions of operation of the normal power system (such as an internal combustion engine or the like), and it is even more particularly directed to a method and apparatus for giving substantial speed of rotation to the turbine shaft and rotor compressor prior to the turbocharger coming into full power operation while at the same time not interfering with the flow of incoming filtered air to the turbine.

BACKGROUND OF THE INVENTION

There is increasing use throughout the world of a turbocharger air blower system to assist internal combustion engines, diesels, and similar customary power plants in automotive vehicles and the like by blowing additional air into the cylinders under certain load conditions to provide additional power for certain situations such as climbing in mountain areas, quick acceleration in entering freeways, and the like.

These turbocharger vehicles work extremely well and provide for increased safety as well as increased satisfaction of performance, as well as for the purpose of reducing the strain on certain conventional engines under adverse conditions.

A common problem, however, is that there is a so-called "turbo lag," which is a short period of time after increased power demand is first sensed as being required until the rotary compressor driven by the exhaust gas turbine reaches its full power capacity.

This turbo lag is caused by inertia of the rotating machinery which must be overcome for the turbine to be brought up to full revolution. When the turbine is exhaust gas driven, there is also blower delay as exhaust volume builds up. The lag is small, amounting to a few seconds. But during these few seconds, there is a delay in the increasing performance, which is particularly undesirable when entering a busy freeway or the like. Thus, safety is also involved.

I have studied this situation and found that the rotary compressor can be mechanically activated by an electric motor or the like and brought up to operation speed prior to the full buildup of exhaust gas pressure under which the turbine is operating.

I have studied at length various ways of signaling or otherwise causing the rotary compressor to brought up to speed prior to the expiration of this "turbo lag" period, and I have studied the matter thoroughly.

I have now conceived and developed a most preferred method of accomplishing this most desirable end.

In its most preferred form, the method of bringing the rotary compressor up to proper operational speed, prior to the full exhaust gas pressure buildup and operation of the turbocharger as an assist to the basic power supply of the vehicle, is by an electric motor of sufficient torque and speed such that by activation manually, or by automatic activation when turbo boast is to be required, the electric motor will impart full speed or near full speed to the rotary compressor before the pressure buildup of the exhaust gas.

In accomplishing this end, I have found that the most desirable method is to insert an electric motor between the exhaust gas turbine of the turbocharger and the conduit bringing in air from the inlet filter of the engine and by attaching the shaft of such a motor to the shaft of the exhaust gas turbine in a unique manner.

SUMMARY OF THE INVENTION

It is, therefore, an object of this invention to provide a method and apparatus to be used with turbocharger assisted power to supply initial shaft rotation to the turbine.

It is a further object to provide such a method and apparatus which will operate from an electric motor powered by the electrical supply of the turbocharger assisted vehicle, or the like.

Another object of this invention is to provide a support structure of such an electric motor to place it in position to impart turbocharger assisted power to the turbine.

It is also an object of this invention to provide such a method and apparatus for imparting a drive from an electric motor to the exhaust gas turbine of a turbocharger assisted vehicle with coupling attachments between the two.

It is still a further object of this invention to provide a magnetic clutch connection between the drive shafts of the electric motor and the shaft of the exhaust gas turbine.

The foregoing and other objects and advantages will become apparent to those skilled in the art upon reading the description of a preferred embodiment which follows, in conjunction with a review of the appended drawings.

BRIEF DESCRIPTION OF THE DRAWINGS

FIG. 4 is an enlarged fragmentary side elevation of the turbocharger apparatus of FIG. 3, with certain parts in elevation, showing an air intake conduit in phantom lines with sectioned portions, as seen along line 4—4 of FIG. 5.

FIG. 5 is an elevational view of the turbo-lag control apparatus as seen from the right side of FIG. 4.

FIG. 5A is a fragmentary view similar to FIG. 5, but showing an alternate method of fabrication.

FIG. 6 is an end view similar to FIG. 5, showing a second preferred embodiment of the invention.

FIG. 7 is a fragmentary section, with parts shown in elevation, and taken along line 7—7 of FIG. 6.

FIG. 7A is a fragmentary side elevation of an alternate modification of a portion of FIG. 7.

FIG. 8 is an exploded view of the components of the device of FIG. 7.

FIG. 9 is a fragmentary section, partly in elevation, view of a magnetic clutch employed in an alternate manner of controlling the apparatus of FIGS. 4 and 7.

FIG. 10 is an electrical diagram of the control circuit of the invention.

FIG. 11 is a side elevational view of the turbo compressor intake tube, with parts broken away and parts taken in section showing a third preferred embodiment of the apparatus for overcoming turbo lag, in accordance with this invention.

FIG. 12 is a right end view thereof.

FIG. 13 is an isometric view thereof, with parts broken away.

DESCRIPTION OF THE PREFERRED EMBODIMENTS

Figure 1:
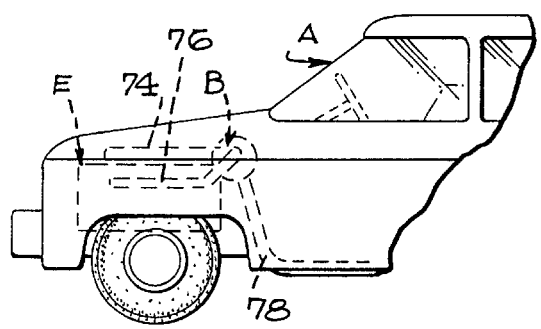
FIG. 1 is a fragmentary side view of a vehicle on a reduced scale to show the subject of the invention as it is located relative to an engine.

The simplified fragmentary view, as seen in FIG. 1, illustrates a vehicle A, with a conventional turbocharger B, or the like, in the engine compartment. The turbocharger typically includes an air compression section C which has a rotary compressor which draws air from an air filter and then moves it to the engine E. An exhaust gas turbine section D, which expands exhaust gases from the engine to the exhaust conduit, is included.

The turbocharger apparatus of the invention is generally indicated by the reference numeral 10 and includes a cylindrical housing 12. This housing comprises an enlarged portion 14 and a reduced portion 16. The enlarged and reduced portions are provided with interior diameters 18 and 20, respectively. A plurality of set screws, or the like, shown at 22, secure the housing 12 onto an extension of the compressor portion C.

The apparatus 10 is shown inserted between the compressor and the air filter. The impeller portion of the rotary air compressor of the turbocharger is shown at 28. The drive shaft is in line with the drive shaft of a motor 30 located within the housing 12 of the apparatus 10. The support of the motor in its proper position is accomplished by the aid of a spider assembly 36.

Figure 3:
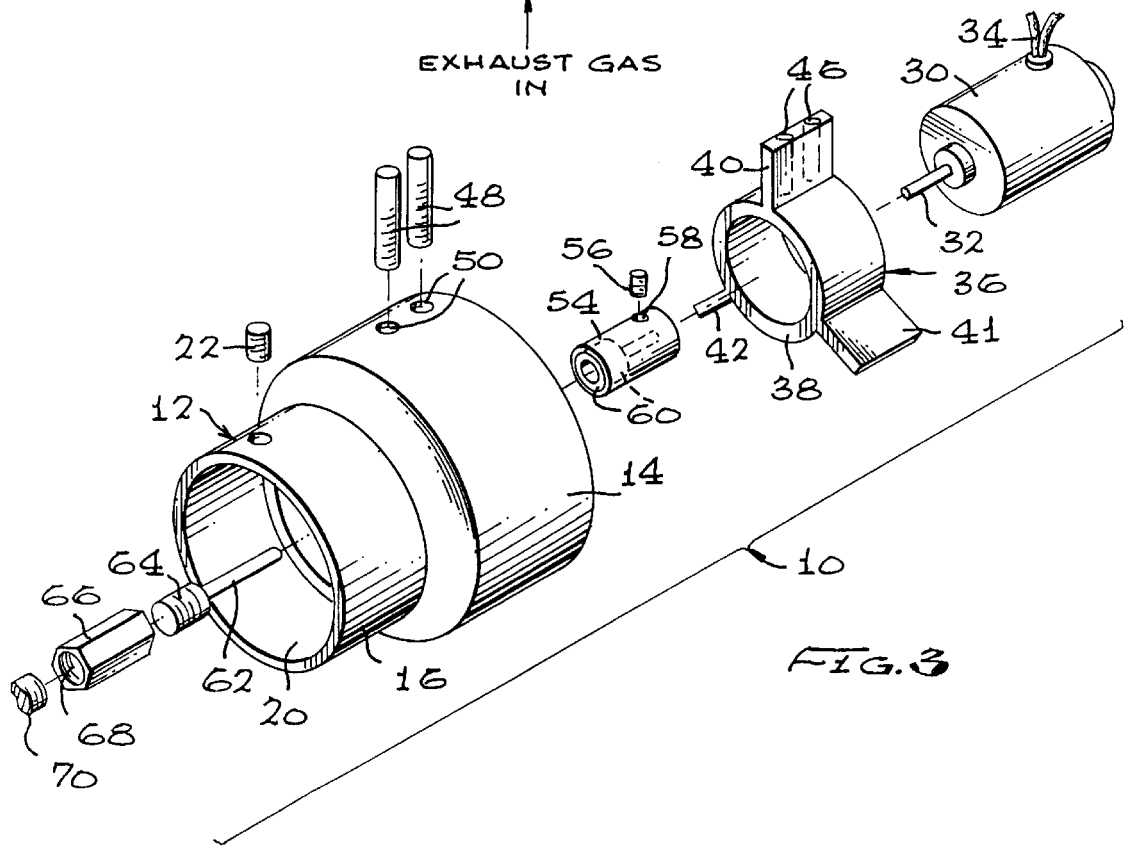
FIG. 3 is an exploded view of a first preferred embodiment of the turbocharger apparatus of this invention.

As shown in the perspective view of FIG. 3, the spider 36 is formed with an annular ring portion 38 having outwardly extending spacer and support legs 40, 42 and 44. The outermost surfaces of these legs fit within the inside diameter 18 of the larger portion of housing 12. The motor 30, with its electrical leads 34, is fitted into the inside diameter of the circular opening formed by ring portion 30 of the spider assembly.

In order to secure the spider properly in position and to keep the motor in place, threaded holes 46 are provided in the leg 40 into which elongated set screws 48 are screwed until they come into contact with the motor housing. These same set screws are threaded through corresponding threaded holes 50 provided in the enlarged end 14 of the housing 12.

The fragmentary section of FIG. 5A illustrates that, if it is desired not to use the set screws to secure the spider to the housing 12, then weldments 52 can accomplish the job. In this case, the motor would be secured by means of set screws 39 passing through the ring 38 through threaded holes.

In order to allow the shaft 32 of the electric motor 30 to impart its drive to the shaft of the rotary compressor impeller 28 of the turbocharger unit, I have provided a coupling device 54. By means of set screw 56 within threaded hole 58 of coupler 54, the motor shaft 32 imparts rotary motion to a stub shaft 62 through a pair of single direction couplings.

The stub shaft is shown with a threaded enlarged end 64, engaging threads in a threaded portion of an adapter nut member 66. The same nut member is threaded onto the existing threaded end 70, which is on the rotary compressor shaft of the turbocharger. If the speed of the rotary compressor rotation exceeds the rpm of the motor 30, the single direction couplings 60 would allow relative motion between the stub shaft and the motor shaft without slowing the rotary compressor or driving the motor to be exposed to adverse stresses.

Figure 2:
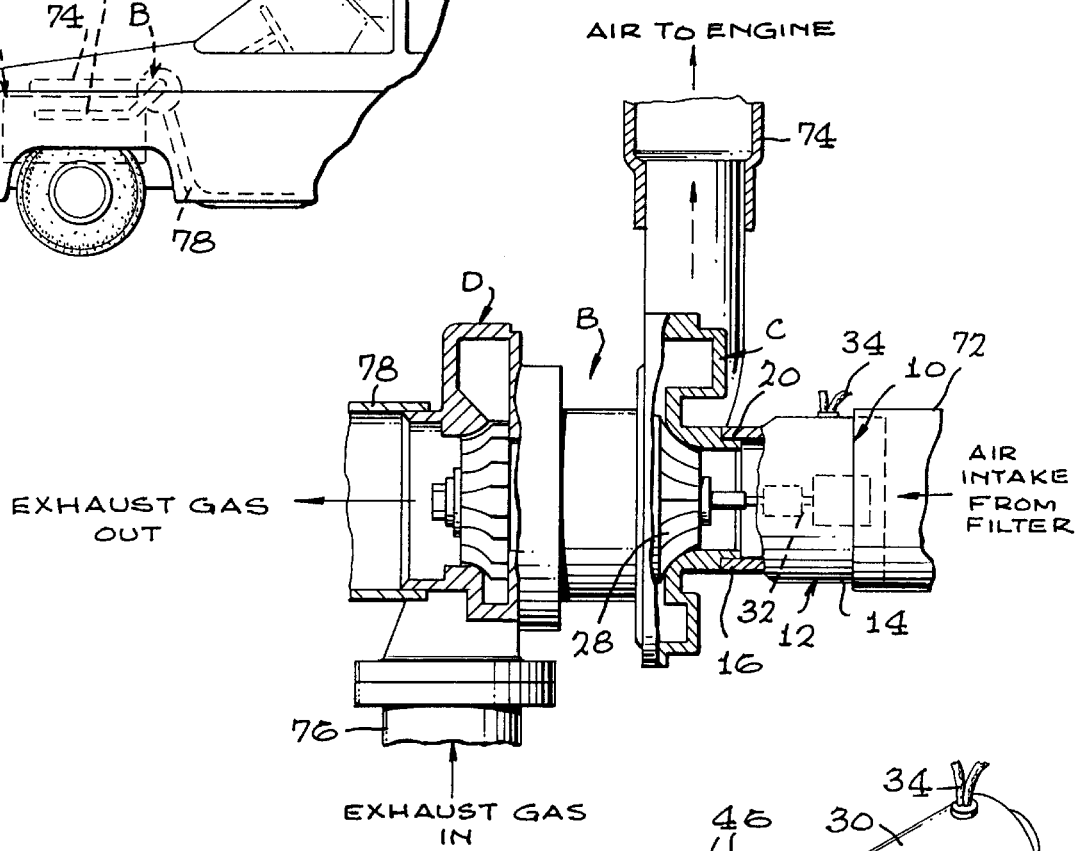
FIG. 2 is a simplified, partly broken away, fragmentary view of a typical turbocharger unit incorporating the apparatus of this invention.

The conduits for handling incoming and outgoing air and exhaust gases are shown in FIG. 2 as 72, 74, 76 and 78, respectively. While these are shown very simply, it is to be understood that, to those familiar in the art, there may be various methods of conduits, and the like.

In the alternate embodiment shown in FIGS. 7 and 8, it can be seen that, in certain cases, an apparatus 220 is built with a combined housing 110 of two sections. An enlarged housing section is shown at 114 and a reduced section is shown at 116. Flanges 115 and 117 are provided for the two halves. Inside diameters 118 and 120 vary to bring forth a reduction to fit on the intake nozzle of the type of turbocharger shown. Openings 119 and 121 are provided in the flanges in order to accommodate fasteners 123. The reduced neck portion of the section 116 is shown at 122 and is secured to the extended portion 124 of the turbine by means of clamps, or the like (not shown).

The motor 130, in this design, is retained in proper alignment so that its shaft 132 is in line with the turbine shaft, by means of a container 136. The motor is fitted through an opening 139 in the container wall and within the inside diameter 141 of the container. Wiring 134 passes through the cylindrical wall of 135, which is shell 138.

To support the container 136 properly within the enlarged end 114, a pair of spacer legs 140 and 142 is formed integrally with the container. The outermost portions of these legs fit into alignment slots 152 and 153 formed in the inside diameter 118 of housing 114 by means of screws 148 passing through openings 150 in housing 114 and into threaded holes 146 formed in the legs 140 and 142.

In this particular design, a retainer plate 155 is shown to further retain the motor 130 from movement. A central opening 155 allows the rear portion of the motor to pass through and to allow the plate to be secured both in the container 136 and into the rear of the motor housing at 130a. Tabs 155b with openings 155c, screws 155d; openings 155e with screws 155f, accomplish this connection.

The coupler, in this embodiment, is shown at 154 with its set screw 156 and threaded hole 158 connected to shaft 132 of the motor. One-way couplings 160 are shown connecting the drive into stub shaft 162. These couplings 160 impart the drive to shaft 162b and then to enlarged end 162a of the stub shaft 162 when the exhaust gas turbine is not driving the compressor faster than the electric motor. Threaded opening 170 in this enlarged end is then threaded onto existing threaded shaft end 171 of the turbine.

As an alternative to the coupler stub shaft, the compressor manufacturer can simply make the shaft project farther at 180 (see FIG. 7A) and eliminate the stub shaft 162 shown in FIG. 7. The retaining nut 171 is simply screwed onto the threaded portion of this new shaft design.

In certain instances, when desired, a drive connection can be established between the motor of the added apparatus and the rotary compressor shaft by means of a magnetic clutch design shown as an alternative embodiment in FIG. 9.

The magnetic clutch, shown generally at 300, is mounted onto motor 330 having a drive shaft 332. A fixed clutch plate 342 is secured by set screw 338 in extension 336 through threaded opening 340, to shaft 332 located in opening 344. Bearing 346 rotatably supports the end of shaft 348 in the clutch plate 342. A coil 334, when activated, allows spindle plate 352 of spindle 350 to rotate on its one-way couplings 354 and thus imparts motion to shaft 348 of turbine 324.

The third preferred embodiment of the apparatus for overcoming turbocharger lag is generally indicated at 410 in FIGS. 11, 12 and 13. In FIGS. 11 and 13, the air flows from left to right. Inlet duct 412 receives air from the air cleaner. The inlet duct 412 transitions to motor duct 414, which is of larger diameter. Outlet duct 416 connects to the rotary compressor inlet duct 418, as seen in FIG. 11. The rotary compressor is mounted in a housing attached to the rotary compressor inlet duct 418. The rotary compressor has hub 420 which carries a rotary compressor drive shaft 422. This is the same as shaft 62 in FIG. 4 and 162b in FIG. 7. The rotary compressor is driven on its opposite side by an exhaust gas turbine so that rotary compressor shaft 422 rotates during normal operation.

Motor housing 424 is positioned with motor duct 414. The motor housing is maintained in the duct by fins 426, 428 and 430. The fins are secured to the exterior of the motor housing 424 and are detachably secured to the motor duct by means of screws 432 and 434, see FIG. 11. As seen in FIG. 11, the motor duct 414 is of larger diameter than the inlet duct 412. In order to permit assembly of the fins within the motor duct, the motor duct is in two pieces at joint 436. Thus, screw 432 and its companion screws into the other fins hold the joint together as well as hold the motor housing 424 in place. The motor housing is streamlined with a substantially semi-spherical dome on each end. The motor duct 414 is sufficiently larger than the inlet duct 412 so that there is equal duct area around the motor housing 424 as there is in the inlet.

A rotary compressor drive motor is mounted in the motor housing and is connected to be suitably driven. Motor output shaft 438 is hollow and carries one-way couplings therein. The couplings may be sprag couplings or the like. The one-way clutch coupling elements are shown at 440 in FIGS. 12 and 13. Turbo-compressor shaft 422 is engaged within motor shaft 438 and is acted upon by the one-way coupling 440. The motor housing 424 is supplied with ventilation openings on its domed end. Ventilation openings 442 and 444 are seen in FIG. 11.

During engine operation at slow speeds or under low power demands, there is insufficient exhaust gas flow to drive the turbocharger at a significant speed. The motor in motor housing 424 is energized, but only enough to run the turbocharger up to the bottom of its operating range. This does not require much electric power, but gets the rotating machinery running up to a speed such that, when there is demand and when there is a substantial amount of exhaust gas generated, the exhaust gas turbine can quickly raise the rotative speed of the turbocharger to a point where it is fully effective. With the rotating machinery running at a substantial speed, the starting inertia need not be overcome, but the electric motor has already overcome a significant amount of the inertia prior to actual demand.

In operation, the electric motor assisted turbocharger method and apparatus basically allows air flowing in from the air filter of the engine to pass unhindered into the exhaust gas turbine area of the turbocharger unit. The spider constructions support the electric motor firmly in line with the shaft of the exhaust gas guaranteeing a smooth transition of the boosting power. The one-way couplings allow the shaft of the electric motor to be released from being in constant drive condition when the speed of the exhaust gas turbine shaft exceeds the speed of the electric motor. In some instances, the design for disconnecting the drive between the electric motor and the exhaust gas turbine is easily accomplished by the electrically operated magnetic clutch shown and described in FIG. 9.

The circuit of FIG. 10, shown by the reference numeral 400, is, of course, only one method of providing wiring and circuitry for controlling the operation of the electric motor of this invention. When it is desired, the manufacturer of the exhaust gas turbine of the turbocharger assisted engine can form the shaft of the exhaust gas turbine with an extension, as shown in FIG. 7A of the drawings. This would eliminate the need for the adapter stub shaft of the embodiments of FIGS. 4 and 7.

The embodiments that have been shown and described, in which one-way couplings are used, are generally for vehicles being used in racing competition where the electric motor would be operating at all times and would be called upon several times during such a race. However, in times when the turbocharger would be only used on occasion, it would be desirable to disconnect the drive shaft of the electric motor entirely. Selecting this mode, the magnetic clutch embodiment would be more desirable to be used in the vehicle.

Recently, it has been found that major automobile manufacturers have been going into the development of the two-stroke engines. These engines have lower combustion temperature and, because of this, substantially reduce the oxides of nitrogen produced. In such engines, due to the fact that every stroke is a power stroke, the intake charge needs to be pressurized. This is often accomplished by channeling the intake charge into the crankcase so that the piston on its downstroke pressurizes the air-fuel mixture and then feeds it into the cylinder. This procedure causes the oil in the crankcase to mix with the air, or conversely, the fuel-air mixture, in order to lubricate the bearings in the crankcase. The presence of oil in the combustion process causes smoke and undesirable pollution. Therefore, pressurizing the air without channeling it through the crankcase would be desirable. This pressurization can be achieved by supercharging the engine by means of an air pump which is run by being coupled to the engine. Super-charges are usually very expensive and also use engine power to operate. The electric motor assisted turbocharger can solve this problem by generating sufficient turbo boost to start the engine until such time that sufficient exhaust gases are generated to run the turbocharger. Thus it can be seen that such a device as this invention would economically and efficiently provide the necessary items for such engines.

While the embodiment of this invention shown and described are fully capable of achieving the objects and advantages desired, it is to be understood that such embodiments are for the purpose of illustration only and not for purposes of limitation.

What is claimed is:

1. A drive system comprising:
    a rotary compressor for delivering compressed air to the inlet of an internal combustion engine, said rotary compressor having a compressor shaft, said rotary compressor having an inlet duct;
    an exhaust gas turbine having an impeller permanently connected to said rotary compressor shaft, said exhaust gas turbine being connected to the engine for receiving exhaust gas from the engine for driving said rotary compressor;

an electric motor in said inlet duct to said rotary compressor, said electric motor having a rotatable shaft therein, said shaft being in axial alignment with said rotary compressor shaft; and a one-way clutch permanently connecting said electric motor to said rotary compressor shaft, said one-way clutch being positioned so that said electric motor drives said rotary compressor at a speed above idle speed until said exhaust gas turbine drives said rotary compressor at a rotative speed higher than the rotative speed of said electric motor so that said rotary compressor always rotates at a speed at least that of the electric motor so that when the internal combustion engine produces more exhaust gas in response to a power demand, said rotary compressor is already running.

2. The drive system of claim 1 wherein said electric motor is in a housing and said housing has ventilation passages therein so that air in said inlet duct cools said electric motor.

3. The drive system of claim 2 wherein said inlet duct around said motor is sufficiently large to permit adequate air flow through said duct around said electric motor.

4. The drive system of claim 3 wherein the air flow area in said duct around said electric motor is at least as large as the air flow area in said duct away from said electric motor.

5. The drive system of claim 4 wherein said motor housing is streamlined to minimize air flow restriction through said inlet duct.

6. A drive system for an internal combustion engine having cylinders and a turbocharger comprising:

a rotary compressor, an air inlet duct on said rotary compressor, an outlet duct on said rotary compressor for connection to an inlet to the cylinders;

an exhaust gas turbine having an inlet duct for connection to an exhaust gas outlet of the internal combustion engine, said exhaust gas turbine having an outlet duct for discharge of exhaust gas;

a shaft permanently connected to both said rotary compressor and said exhaust gas turbine so that said rotary compressor and said exhaust gas turbine run at the same speed, said shaft defining an axis;

an electric motor lying on said axis, said electric motor having a motor shaft, a one-way clutch, said one-way clutch being connected to said motor shaft and to said shaft so that said electric motor can drive said rotary compressor in an air-compressing direction, said motor lying in said air inlet duct to said rotary compressor so that when said electric motor is energized, said rotary compressor has a minimum rotative speed equal to the rotative speed of said electric motor and said rotary compressor can run faster than said electric motor when driven faster by said exhaust gas turbine so that said rotary compressor is always driven at a least said minimum rotative speed.

7. The drive system of claim 6 wherein said inlet duct is larger around said electric motor than at the inlet to said turbo-compressor to maintain adequate air flow area to said turbo-compressor.

8. The drive system of claim 7 wherein said motor is mounted in a housing and said housing is mounted on fins within said inlet duct.

9. The drive system of claim 8 wherein said motor housing is streamlined and has vent openings therein to minimize pressure drop around said motor housing and to provide air ventilation to said motor.

10. The method of maintaining a turbocharger ready for prompt response comprising the steps of:

providing a rotary compressor for connection to an internal combustion engine for drawing air into an inlet and for the delivery of air to the engine;

providing an exhaust gas turbine for connection to an exhaust of the internal combustion engine so that the exhaust gas turbine is rotationally driven by exhaust gas from the internal combustion engine;

providing a coupling between the exhaust gas turbine and the rotary compressor so that the rotary compressor always operates at the same speed as the exhaust gas turbine;

providing an electric motor and a one-way coupling connected to the rotary compressor so that the electric motor always drives the rotary compressor at least a minimum rotative speed and the exhaust gas turbine can drive the rotary compressor higher than the minimum speed without driving the electric motor higher than the minimum speed; and positioning the electric motor in axial alignment with the rotary compressor and exhaust gas turbine and positioning the electric motor within the air inlet to the rotary compressor so that the electric motor is cooled by inlet air to the rotary compressor so that the rotary compressor is always operating at a speed at least ready to supply rotary compressed air to the internal combustion engine.

11. The method of claim 10 further including providing an air inlet duct around the motor so that air to the turbo-compressor is not impeded but cools the electric motor.

12. A drive system for an internal combustion engine having cylinders and a turbocharger comprising:

a rotary compressor, an air inlet duct on said rotary compressor, an outlet duct on said rotary compressor for connection to an inlet to the cylinders;

an exhaust gas turbine having an inlet duct for connection to an exhaust gas outlet of the internal combustion engine, said exhaust gas turbine having an outlet duct for discharge of exhaust gas;

a shaft permanently connected to both said rotary compressor and said exhaust gas turbine so that said rotary compressor and said exhaust gas turbine run at the same speed, said shaft defining an axis;

an electric motor lying on said axis, said electric motor having a motor shaft, said electric motor shaft lying on the same axis as said shaft connected to said rotary compressor and said exhaust gas turbine, a clutch connected to both said motor shaft and to said shaft connected to said rotary compressor and to said exhaust gas turbine so that when said clutch is actuated, said electric motor is connected to drive said rotary compressor.

13. The drive system of claim 12 wherein said electric motor lies within said air inlet duct on said rotary compressor so that air to said rotary compressor cools said electric motor.

14. The drive system of claim 12 wherein said clutch is an electric clutch the energization of which can be controlled to couple and decouple said electric motor shaft from said rotary compressor and exhaust gas turbine shaft.

15. The drive system of claim 14 wherein said electric motor lies within said air inlet duct on said rotary compressor so that air to said rotary compressor cools said electric motor.

* * * * *

UNITED STATES PATENT AND TRADEMARK OFFICE
CERTIFICATE OF CORRECTION

PATENT NO. : 5,771,695
DATED : June 30, 1998
INVENTOR(S) : Edward M. Halimi, et al.

It is certified that error appears in the above-indentified patent and that said Letters Patent is hereby corrected as shown below:

On the title page, insert item [73] Assignee
-- Assignee: Turbodyne Systems, Inc., Carpinteria, California--

Signed and Sealed this

Fourteenth Day of March, 2000

*Attest:*

Q. TODD DICKINSON

*Attesting Officer*     *Commissioner of Patents and Trademarks*